United States Patent [19]

Singla-Casasayas

[11] Patent Number: 5,783,009
[45] Date of Patent: Jul. 21, 1998

[54] MANUFACTURING PROCESS OF SHEET-LIKE BODIES COMPRISING SEAT PARTS FOR VEHICLES AND THE LIKE

[75] Inventor: Juan Singla-Casasayas, Martorelles, Spain

[73] Assignee: Fabricacion Asientos Vehiculos Industriales, S.A. (FAINSA), Martorelles, Spain

[21] Appl. No.: 493,777

[22] Filed: Jun. 22, 1995

[30] Foreign Application Priority Data

Jun. 22, 1994 [ES] Spain ........................ 9401359

[51] Int. Cl.$^6$ .................................. A47C 27/00
[52] U.S. Cl. .................. 156/90; 156/214; 156/228; 156/267; 156/309.6; 156/332
[58] Field of Search ................ 156/228, 242, 156/245, 267, 308.2, 309.6, 331.6, 332, 90, 212, 213, 214; 264/320; 428/95, 97, 284, 287, 290

[56] References Cited

U.S. PATENT DOCUMENTS

| | | | |
|---|---|---|---|
| 2,227,212 | 12/1940 | Beck | 156/90 |
| 4,581,193 | 4/1986 | Lesley | 264/320 |
| 4,705,818 | 11/1987 | Kawai et al. | |
| 4,917,931 | 4/1990 | McDowell et al. | 428/95 |
| 5,000,805 | 3/1991 | Lowe | 156/90 |
| 5,098,770 | 3/1992 | Paire | 428/287 |
| 5,149,582 | 9/1992 | LaMarca, II et al. | 428/284 |
| 5,169,469 | 12/1992 | Feeley | |
| 5,238,989 | 8/1993 | Takei et al. | |
| 5,326,417 | 7/1994 | Phelps | 156/245 |
| 5,486,256 | 1/1996 | Romesberg | 156/90 |

FOREIGN PATENT DOCUMENTS

| | | |
|---|---|---|
| 367079 | 10/1981 | Austria. |
| 013468 | 1/1979 | European Pat. Off. . |
| 343245 | 11/1989 | European Pat. Off. . |
| 500202 | 8/1992 | European Pat. Off. . |
| 2133630 | 12/1972 | France. |
| 2037309 | 5/1971 | Germany. |
| 4139035 | 6/1993 | Germany. |
| 54-055077 | 1/1979 | Japan. |
| 57-178829 | 4/1982 | Japan. |
| 60-217130 | 10/1985 | Japan. |

Primary Examiner—Michael W. Ball
Assistant Examiner—Michael A. Tolin
Attorney, Agent, or Firm—Klauber & Jackson

[57] ABSTRACT

It consists of continuous production of a woven or unwoven piece of textile fibers, to whose piece a layer that is going to be the middle one is affixed on the back surface. It is thick enough to offer resistance to the passing of a thermostable material that will be finally affixed to the same, wherein it will remain imbedded. The textile compound formed of the two layers referred to first of all, the second layer being an unwover layer, is subjected to a hot pre-forming process. Then it is inserted in a mold in which the thermostable material formed by a polyester-fiber glass mass is placed, hot pressing the whole and obtaining a rigid and resistance sheet-like body, whose visible surface is covered with the layer of textile compound that is highly resistant to vandalism. If the textile piece is consistent or thick enough, the middle layer could be eliminated, in which case the polyester-fiber glass mass would remainly closely affixed to that textile piece, with the insertion of the respective waterproof adhesive layer.

9 Claims, 2 Drawing Sheets

MANUFACTURING PROCESS OF SHEET-LIKE BODIES COMPRISING SEAT PARTS FOR VEHICLES AND THE LIKE

OBJECT OF THE INVENTION

As stated in the title of this specification, the present invention refers to a manufacturing process of sheet-like bodies comprising seat parts for vehicles and the like, with the particularity that these seat parts will constitute that which is considered as the back of the seat or even the seat itself, without ruling out the possibility that the same process may be used to obtain sheet-like bodies applicable in another field of the industry.

Basically the process is based on obtaining hot molded bodies or pieces made out of a thermostable material and a textile compound, all obtained by means of a series of operative steps which hot molding forms a part of to obtain the nonseparability between the thermostable material and the textile compound.

BACKGROUND OF THE INVENTION

The manufacturing of seats for vehicles, such as for example of the seats placed in public transportation vehicles, such as city buses, subway cars, etc. has been constantly subject to evolution for the purpose of adapting it to the conditions and requirements at each moment.

In this sense, the use of plastic as the material to manufacture the type of seat referred to, began to be used in a general way, since this material was not only a way to provide protection against vandalism, but it is also a much more durable, cheaper and light material that can even be used to obtain any design.

However, plastics have the inconvenience that they burn easily and besides they are very toxic.

Then polyesters began to be used. These materials turned out to be much less toxic and even more resistant to fire and, in the event of burning, the density of smoke produced by these materials is much less than that caused by plastics.

In any case, plastics and polyesters are materials that feel cold to the passenger and besides they are very hard, so that when used as seats for public transportation vehicles, some users initially dislike the seats made out of them.

In an attempt to overcome these problems, that is to say, to eliminate the feeling of cold and hardness that seats of public transportation vehicles have when they are made out of plastics or polyesters, seats began to be made out of these materials with fabrics covering their surface.

Now then, the problem and inconvenience that this type of seat covered with fabric has is that the manufacturing cost is very high and there is a enormous problem with the final finishes, since it is practically impossible to give them an attractive finish. Besides, the fabric layer, that is affixed to the surface by means of a layer of adhesive or glue, usually separates after while, since with temperature and time these glues or adhesives lose part of their qualities and the fabric separates from the surface of the seat itself, irrespective of the fact that upon not being able to obtain a suitable surface, typical fraying starts.

On the other hand, U.S. Pat. No. 4,917,931 claims a seat insert which is to be attached or removed from a conventional seat, in such a way that structurally said insert is formed from a hard substrate on which a fabric layer, with multiple vertical fibers is glued, with an adhesive. Now then, though said insert turns out to be resistant to vandalism, it involves numerous problems and inconveniences.

Likewise, U.S. Pat. No. 5,098,770, which claims a fireproof and waterproof textile compound that can be applied to a seat, specifically to be inserted between an outside fabric layer and the foam elements of the seat itself can be cited.

Structurally, the compound claimed in this U.S. patent comprises a first textile unwoven sewn layer with a thermostable fiber base, that includes a second layer formed by a microporous and impervious to liquid, steamproof and inflammable film also comprising a discontinuous layer of adhesive placed between the first layer and the second layer.

In principle, this textile compound is not thought to be used on the hard type of polyester plastic seat that has been alluded to above.

U.S. Pat. No. 5,149,582, which claims a textile compound laminate material that can be used as a surface covering, adapting to the covering and protecting it against fire and performation, can also be cited. The compound is formed by a plurality of layers, including a metal one to give it fireproof and thermal disipating properties.

Now then, none of the materials claimed in these U.S. patents, meets the condition of forming an inseparable part or single piece body with the surface that it is applied to.

DESCRIPTION OF THE INVENTION

The invention refers to a process by means of which a sheet-like body that is fundamentally provided for to comprise one part of a seat for vehicles and the like is obtained, in the event that the molding thereof is done to form part of the cited seat.

In a specific way, the process in question consists of continuous production of a woven or unwoven textile piece, to whose piece a polyester-fiber glass thermostable mass (known as SMC) is affixed on the rear surface with the insertion of a waterproof adhesive layer that will also act as a barrier to prevent the thermostable material SMC) from mreaching the visible or front surface of the textile piece.

In the event that the textile piece is not consistent enough or is not thick enough, then a middle layer is inserted between the adhesive layer and the layer of thermostable material, whose middle layer will be thick enough to provide resistance upon the passing of the thermostable material (SMC) preventing the latter from reaching the visible surface of the textile piece.

The textile compound piece, whether it is a single one or one formed of a first and middle layer as commented on above, the middle layer always being of unwoven fibers, will be cut in accordance with the established patterns so as to carry out a subsequent hot pre-molding of those parts resulting from the cut, which will have the form of another mold in which they are introduced, with the visible surface in contact with the walls of the mold, finally depositing in the mold the polyester-fiber glass mass (SMC) and finally carrying out the hot pressing of the whole, definitively obtaining a rigid and resistant sheet-like body, which can include elements for connection to other bodies, such as other parts of the seat in the event that it is used in the construction of a seat, determining that the definitive body has its visible surface covered with the textile fiber layer, firmly adhered and very resistant to acts of vandalism and the like.

DESCRIPTION OF THE DRAWINGS

In order to complement the description that is made hereinafter and for the purpose of providing a better understanding of the characteristics of the invention, a set of drawings on the basis of whose figures the structural characteristics of the body obtained by means of the process object of the invention, is attached to the present specification.

DESCRIPTION OF THE PREFERRED EMBODIMENT

Figure 1:
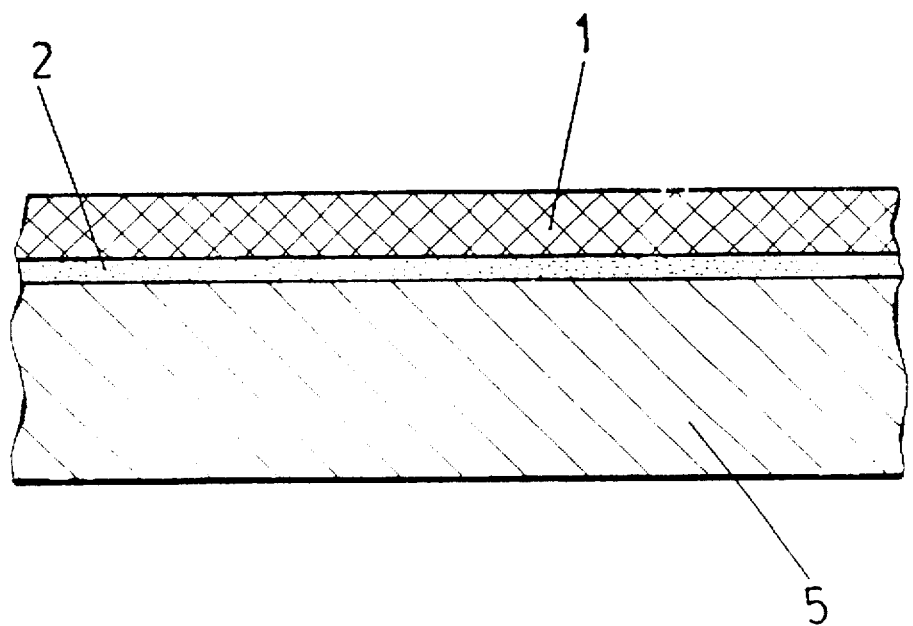
FIG. 1 represents a section of one part of the sheet-like body obtained in accordance with the process of the invention, wherein the textile layer, the adhesive layer and the layer formed of thermostable material (SMC) are clearly seen.
Figure 2:
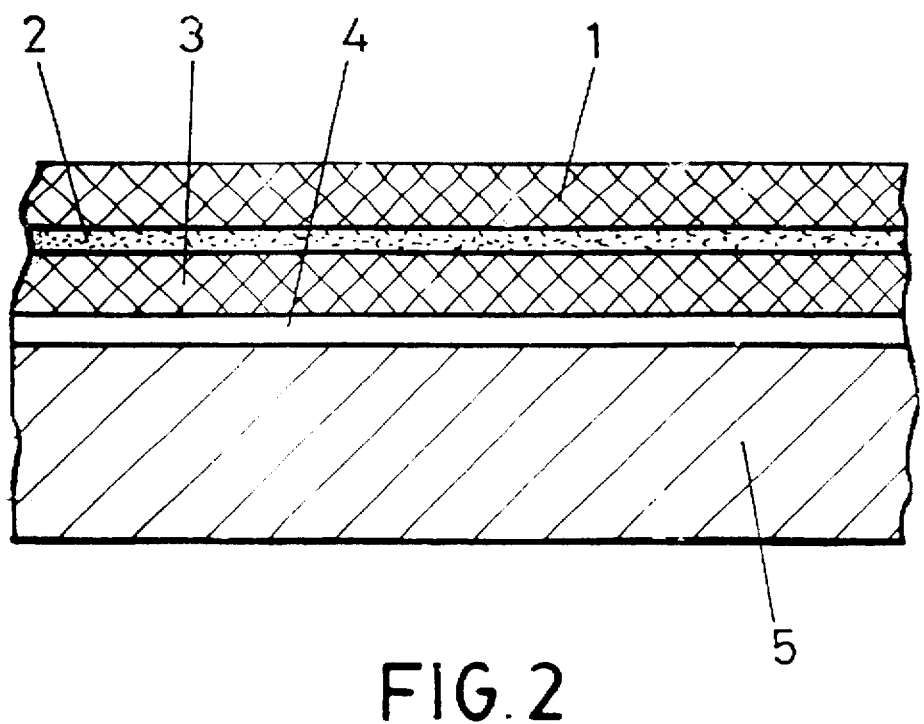
FIG. 2 shows another section of a portion of the sheet-like body obtained, when the same includes a middle barrier layer for the thermostable material (SMC.)

The process of the invention, as has been said throughout the present description, is based on achieving first of all a molded textile compound piece, that is fastened, also by hot molding, to a thermostable material layer comprised of a polyester-fiber glass mass, commonly known as SMC, or Sheet Moldable Compound, or Sheet Moldable Composition. The SMC may be made from a thermostable material mass (5) which comprises an unsaturated polyester resin, mineral fillers, catalysts and glass fibers of a length between 15 and 50 mm.

In this sense, according to the process, one starts with a textile fiber piece (1) that may be of wool, polyester, acrylic, etc., woven or unwoven, to whose back surface a consistent and waterproof adhesive layer (2) preferably of acrylic resin, will be applied, the latter comprising an adhesive means and in turn a barrier to prevent a third layer (5), formed out of a thermostable polyester-fiber glass (SMC) material that is applied by pressure and heat, from reaching the visible surface of the textile piece (1.)

In the event that the textile piece (1) is not very consistent, then a middle layer that will serve as a barrier for the thermostable material mass is applied, the middle layer being formed by an unwoven film (3) whose outside or rear surface has a waterproof layer (4) applied to it, in such a way that layers (2), (3) and (4) remain arranged between the layer that comprises the textile piece (1) and the layer that forms the thermostable polyester-fiber glass material (5.)

The textile layer or piece (1) will be passed through a machine by means of which the gluing on the rear surface of the same of the unwoven layer (3) takes place, with the insertion of the acrylic resin layer (2) with a density of 30 to 35 gr/m², preferably. Then the waterproof layer (4) is applied to the outside surface of the unwoven layer (3), the waterproof layer (4) being comprised of a fire-proof PVC resin with a density between 50 and 120 gr/m². Then this textile compound is die-pressed in a hydraulic press with a shearing die, finally carrying out an overlocked stitching in a machine suitable for this purpose.

The textile compound referred to is hot-preformed at a temperature between 90° C. and 150° C., in mold and counter-mold, at a pressure between 1 and 4 kg/cm², so that the heating time will be between 30 and 90 seconds, while the forming time of the textile compound, in other words, the pressing in the mold and countermold will be between 90 and 120 seconds.

Once the above mentioned textile compound has been obtained and formed, in which the acrylic resin used as a connection means is a thermoformable resin and the unwoven protective/connecting film is felt, then this textile compound is placed in a mold with the outside surface of the base layer of textile fibers (1) in contact with the surface of the mold, while between the opposite surface of the textile compound and the other surface of the mold the polyester-fiber glass mass, which is a thermostable material (SMC), a compound of an unsaturated polyester resin, mineral fillers, catalysts and fiber glass of a length between 15 and 50 mm., is deposited, carrying out the definitive molding at a temperature between 130° C. and 160° C. and a pressure between 70 and 130 Kgr/cm², the mold and counter-mold used being made out of steel and the pressure device being a suitable hydraulic press.

In short, the process is based on obtaining the whole or body in a single operation, introducing the textile compound in a mold together with the polyester-fiber glass mass (SMC), then applying pressure and after a polymerization time obtaining a homogeneous body in which the textile surface free of resin, but perfectly connected to the thermostable mass that comprises the (SMC), is clearly differentiated.

The waterproof layer (4) and the unwoven film layer (3) are applied for the purpose of preventing the polyester-fiber glass (SMC) from not reaching the visible or rear surface of the textile layer (1). Thus, these layers constitute a barrier or shield for that polyester-fiber glass mass. When there is no middle layer the barrier is determined by the adhesive layer (2) and the high consistency itself of the textile layer or piece (1.)

The sheet-like body thus obtained, in accordance with the shape of the mold, will be able to have one shape or another to constitute one part of the seat, or to even be molded with a suitable shape to form another element or article, and in any case, in the molding phase itself, the suitable elements can be applied with which the final body is to come out for fastening thereof to other parts or bodies of the seat or object in question.

I claim:

1. A manufacturing process of sheet-like bodies to be used as seat parts for vehicles, said process comprising the subsequent steps of:

fastening an adhesive acrylic resin layer (2) on a surface of a base layer (1), said base layer comprising a woven or unwoven piece of textile fibers, thereby obtaining a first object;

die-pressing said first object, thereby obtaining a second object;

pre-molding and corresponding hot forming of the second object, thereby obtaining a third object;

introducing the third object in a mold, placing a first surface of the third object in contact with the walls of the mold, wherein said first surface is a visible surface of the base layer (1);

depositing on said mold a thermostable material mass (5) formed of polyester-fiber glass, in contact with a second surface of said third object, said second surface being essentially complementary to said first surface; and hot pressing the contents of the mold, thereby obtaining a single molded sheet-like body.

2. The process according to claim 1 wherein in the event the textile fiber base layer is not very consistent, a middle layer formed by an unwoven fiber film (3), provided on its outside or rear surface of a waterproof layer (4), is applied on the outside or rear surface of the adhesive acrylic resin layer (2) of the first object.

3. The process according to claim 1 wherein the textile fiber base layer (1) may be woven or unwoven, with a grammage between 150 and 1000 gr/m².

4. The process according to any of claims 2 or 3 wherein the acrylic resin layer (2) is inserted as an adhesive means between the base layer (1) and the unwoven fiber film (3) has a weighting of between 20 and 80 gr/m².

5. The process according to any of claims 2 or 3 wherein the waterproof layer (4) is made from a fireproof PVC resin layer having a weighting between 40 and 150 gr/m².

6. The process according to any of claims 1, 2 or 3 wherein the first object is die-pressed by means of a hydraulic press with a shearing die.

7. The process according to any of claims 1, 2 or 3 wherein the second object is pre-molded and hot-formed by heat and pressure molding, at a temperature between 90° and 150° C. and at a pressure between 1 and 4 kg/cm², for a period of time from 30 to 120 seconds.

8. The process according to any of claims 1 2, or 3 wherein the thermostable material mass (5) comprises an unsaturated polyester resin, mineral fillers, catalysts and glass fibers of a length between 15 and 50 mm.

9. The process according to any of claims 1, 2 or 3 wherein the contents of the mold are hot pressed at a temperature between 130° and 160° C. and at a pressure of 70 to 130 kgr/cm².

* * * * *